United States Patent

[11] 3,593,149

[72] Inventor Joseph A. Worcester
Frankfort, N.Y.
[21] Appl. No. 7,145
[22] Filed Jan. 30, 1970
[45] Patented July 13, 1971
[73] Assignee General Electric Company

[54] AUTOMATIC CIRCUIT FOR RECEPTION OF REDUCED CARRIER SIGNALS
7 Claims, 1 Drawing Fig.

[52] U.S. Cl. .... 325/329, 325/490
[51] Int. Cl. .... H04b 1/68
[50] Field of Search .... 325/315, 317, 319, 328, 329, 485, 490

[56] References Cited

UNITED STATES PATENTS 3,072,849 1/1963 Firestone .... 325/319

*Primary Examiner*—Robert L. Griffin
*Assistant Examiner*—James A. Brodsky
*Attorneys*—W. Joseph Shanley, Jr., Frank L. Neuhauser, Oscar B. Waddell, Joseph B. Forman and Marvin A. Goldenberg

ABSTRACT: A carrier signal restoration circuit adopted to cooperate with a conventional intermediate frequency amplifier having a standard diode detector connected to the output thereof. The circuit includes a voltage divider connected to the detector output for developing a positive potential indicative of the amplitude of the carrier in the detected signal. A negative potential indicative of the average sideband amplitude in the signal is developed by a pair of voltage doubling diodes and a capacitor also connected to the detector output. When the carrier is attenuated or suppressed, the circuit develops a net negative potential which increases the conduction of a transistor and the current flow through a feedback winding in the amplifier circuit so as to activate a tuned circuit which restores the carrier signal.

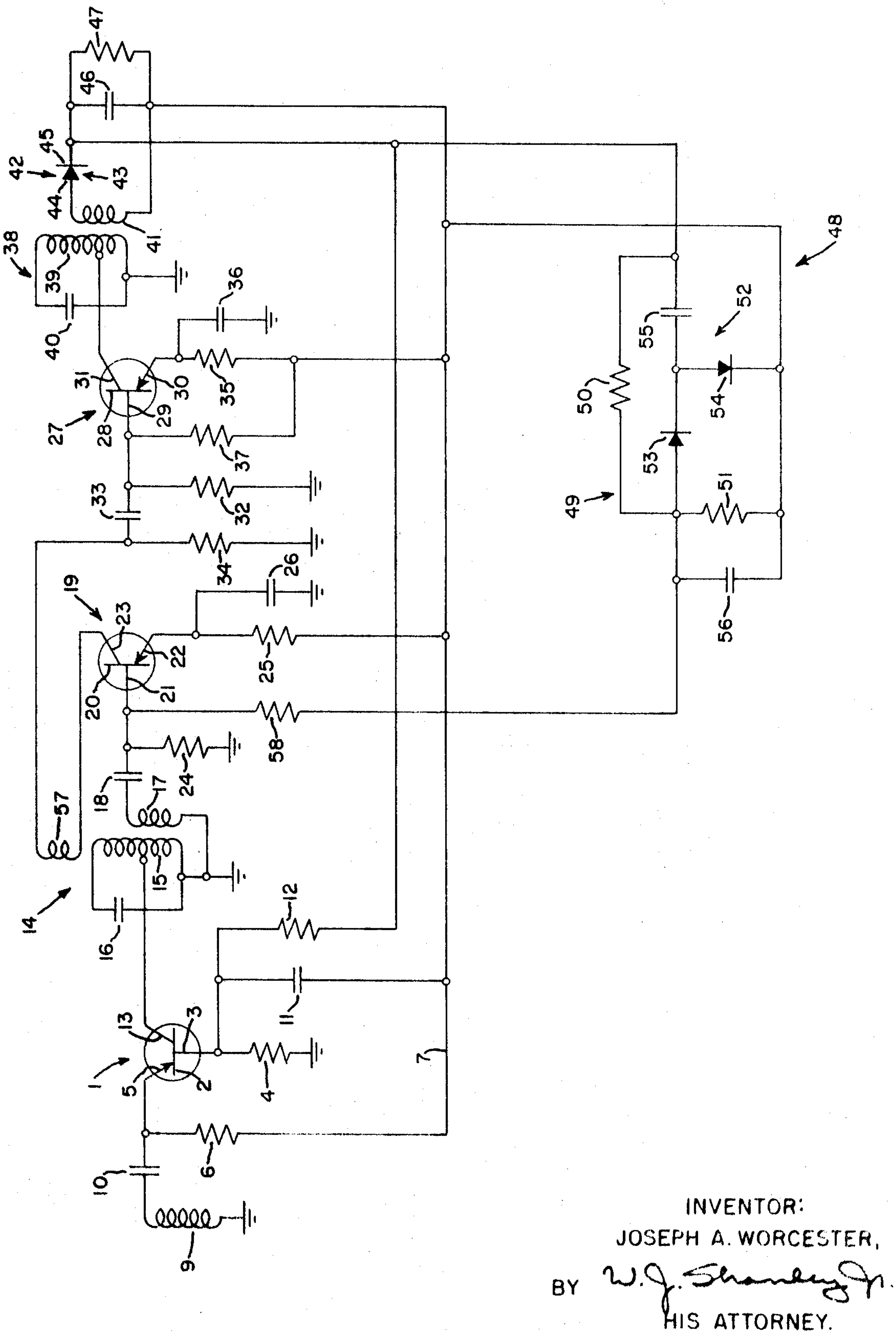
INVENTOR:
JOSEPH A. WORCESTER,
BY W. J. Shanley Jr.
HIS ATTORNEY.

AUTOMATIC CIRCUIT FOR RECEPTION OF REDUCED CARRIER SIGNALS

BACKGROUND OF THE INVENTION

This invention relates to communication systems and, more particularly, to a radio receiver capable of receiving transmissions in which the carrier is either fully present or suppressed or attenuated.

The frequency, amplitude and phase of the carrier component of an amplitude-modulated wave are unaffected by the presence or absence of modulation. The carrier accordingly contains none of the intelligence represented by the modulation and therefore need not be transmitted. All that need be transmitted is one or both of the sidebands which contain all of the information present in the modulated wave. In addition to the fact that the carrier contains none of the intelligence represented by modulation, a transmission of the carrier is wasteful of power since it is known that at least two-thirds of the transmission power is needed to transmit the carrier. Thus the principal advantage of suppressed carrier communication systems is the significant increase in the effective radiated speech power for a given power input. Suppressed carrier transmissions have been used extensively in communication over wire lines and have been found to be particularly useful in radiotelephone or "walkie-talkie" applications.

Suppression or attenuation of the carrier thus has the significant advantage of a considerably reduction in the power which would normally be used to transmit the signal and a consequent significant increase in the speech power radiated for a given power input. In the receiver portion of the communication system it is necessary, in many instances, to insert a demodulation carrier of the same frequency or of a precisely related frequency to that which is used for modulation of the transmitter in order to derive the demodulated signals with satisfactory intelligibility and readability. Thus, although the significant advantage of suppressed carrier systems is the saving in transmission power, the price to be paid is an increase in the complexity of the receiver. One common scheme for carrier reinsertion shown in the prior art is a separately excited oscillator connected to the detector portion of the receiver and cooperatively acting with the automatic frequency control system of the receiver. The disadvantage of such schemes including a separate oscillator is the increased complexity of the equipment included in the receiver. In transmissions where the carrier is attenuated instead of being entirely suppressed, prior art schemes have included amplification or filtering arrangements whereby the attenuated carrier may be amplified and reconditioned. Such schemes would have the advantage of reduced complexity but, on the other hand, would not function properly with transmissions in which the carrier was entirely absent.

Therefore, it would be desirable to provide a carrier restoration scheme which is both of simple construction and adapted to function with transmissions both of the type where the carrier is entirely absent or suppressed and of the type where the carrier has been attenuated to pilot proportions. Such a scheme would be particularly useful in radio telephones or "-walkie-talkies" where a saving in complexity of design is imperative.

SUMMARY OF THE INVENTION

It is, therefore, an object of this invention to provide a radio-receiver circuit capable of receiving either conventional double sideband transmissions or transmissions where the carrier has either been attenuated to pilot proportions or has been suppressed.

It is a more particular object of this invention to provide a carrier restoration scheme for a radio receiver which scheme will be operative either when the carrier has been attenuated to pilot proportions or when the carrier has been entirely suppressed.

It is a further object of this invention to provide a carrier restoration scheme for a radio-receiver circuit, which scheme will be operative in response to the reduction of the amplitude of the carrier signal appearing on the output of the receiver detector.

It is a further object of this invention to provide a radio receiver intermediate frequency amplifier circuit wherein the amplitude of the carrier signal in the output of the detector to which the amplifier is connected is sensed and restoration of the carrier is initiated in response to a reduction of that amplitude.

Briefly stated, in accordance with this invention, there is provided a carrier restoration scheme which may cooperate with a conventional intermediate frequency amplifier which receives heterodyned radio frequency signals and which amplifier includes a detector connected to the output thereof at which detector both radio and audio frequency signals are present. A voltage of a first polarity is obtained from the detector output which voltage is proportional to the amplitude of the carrier signal appearing at the detector output. A voltage of a second, opposite polarity is obtained from the detector output which voltage is proportional to the average sideband amplitude of the signal on the detector output. These two voltages are then combined in a manner such that when the carrier is fully present on the detector output, that is, neither suppressed nor attenuated to pilot proportions, the two voltages will be equal in magnitude but opposite in sign so as to cancel each other. When the carrier is entirely suppressed or when it is attenuated to pilot proportions, a negative voltage will result from the combination and this net negative voltage is utilized to activate a tuned circuit included within the intermediate frequency amplifier transmission path so as to provide carrier restoration.

DETAILED DESCRIPTION

This invention is recited in the appended claims. A more thorough understanding of the advantages and further objects of this invention can be obtained by referring to the following description taken in conjunction with the sole accompanying FIG. which illustrates a circuit incorporating this invention.

The sole FIG. of this application illustrates a radio receiver intermediate frequency amplifier to which this invention is applicable. Although an intermediate frequency amplifier circuit is illustrated in this particular example, it should be understood that this invention may be cooperatively associated with a more general arrangement characterized as a signal transmission path including a plurality of transformer and amplifier stages, each transformer having a tuned input, to which transmission path would be applied an input heterodyned radiofrequency signal and which path would include a detector at the output thereof on which detector would appear both the carrier and the sideband signals included in the transmission.

Referring now to the specific intermediate frequency amplifier circuit shown, a first amplifier stage 1 is included comprising PNP transistor 2 which is connected as a grounded base amplifier. More particularly, base terminal 3 of transistor 2 is connected through a biasing resistor 4 to ground and the emitter 5 is connected through a resistor 6 to a low potential line 7 which is connected to the negative terminal of the detector output which will be apparent from a further reading of the specification. The heterodyned radiofrequency signal is applied at the amplifier input terminal through a grounded coil 9 and a coupling capacitor 10 to the emitter 5 of the transistor. The coil 9 may be designated a part of a first transformer stage. The base terminal 3 of transistor 2 is also connected through a capacitor 11 to the low potential line 7, and automatic volume control voltage from the detector is applied to the base terminal through a resistor 12 in a conventional manner as will be apparent from a further reading of the specification. The collector 13 or output terminal of transistor 5 is connected to the input of an intermediate, in this example, a second transformer stage 14. The transformer has a tuned input comprising input winding 15 and capacitor 16 connected thereacross which tuned circuit is connected to ground. The output of transistor amplifier 2 is connected to the input winding 15. The output of the transformer comprises winding 17 which is connected through a coupling capacitor 18 to the input of an intermediate, in this example, a second amplifier stage 19 comprising PNP transistor amplifier 20 having base, emitter and collector terminals 21—23, respectively. Base terminal 21 is connected to ground through a biasing resistor 24. The emitter 22 of transistor 20 is connected to the low potential line 7 through a resistor 25 and also to ground through a capacitor 26.

Whereas intermediate frequency amplifiers may have any number of successive transformer and amplifier stages, in this particular illustration there is shown a third or final amplifier stage 27 including transistor amplifier 28 having base, emitter and collector terminals 29—31, respectively. The input of this amplifier stage is connected to the output of the intermediate or second amplifier stage by means contemplated by this invention as will be explained further on in the specification. The base terminal 29 of transistor 28 is connected through a biasing resistor 32 to ground and receives the transmitted signal through a coupling capacitor 33 which is connected through resistor 34 to ground. The emitter 30 of transistor 28 is connected through a resistor 35 to the voltage line 7 and through a capacitor 36 to ground. The base terminal 29 of the transistor 28 is also connected to the voltage line 7 through a resistor 37.

The output of the final amplifier stage 27 is connected to the input of a final transformer stage 38. Specifically, transformer stage 38 includes a tuned input comprising input winding 39 and capacitor 40 connected thereacross. The output or collector terminal 31 of transistor 28 is connected to the input winding 39 and the tuned circuit is connected to ground. The transformer stage 38 is provided with an output winding 41 which is connected to a conventional diode detector 42. More particularly, the detector comprises a diode 43 having an anode 44 connected to one terminal, in this example the positive terminal, of the transformer output coil 41 and a cathode 45 connected to a load comprising capacitor 46 and resistor 47 connected in parallel. The detector output signal is taken from the resistor 47 and the resistor and capacitor are also connected to the other terminal of the transformer output winding 41.

When a conventional signal is transmitted through the circuit there will appear across the detector output both a carrier signal and a sideband signal. The positive bias across the resistor 47 which may be obtained from cathode 45 of diode 43 is representative of the amplitude of the carrier signal appearing thereon. The detector output also includes a potential including audio voltages which is representative of the average sideband amplitude.

In accordance with this invention there is included means 48 connected between the output of the detector 42 and the input of the amplifier stage 19 for providing a voltage output to that amplifier stage in response to a reduction in amplitude of the carrier signal appearing on the detector output. More particularly, a first means 49 comprising a voltage divider in the form of resistors 50, 51 is connected to the detector output at the cathode 45 of diode 43 for developing a positive potential which is proportional to the amplitude of the carrier signal appearing in the detector output. A second means 52 comprising diodes 53, 54 which form a voltage doubling network and capacitor 55 is connected to the detector output for developing a negative potential having an amplitude proportional to the amplitude of the sideband signal appearing in the detector output. More particularly, audio voltages from the detector 42 are transmitted through the capacitor 55 and are rectified by the diodes 53, 54. A voltage combining means comprising capacitor 56 is connected across both the resistor 51 of the voltage divider and the voltage doubling diodes 53, 54. The value of resistor 50 in the voltage divider network is chosen so that the net voltage across the combining means or capacitor 56 is zero when a conventional signal is present in the detector output.

There is also provided in accordance with this invention inductive means in the form of feedback winding 57 which is coupled to the input winding 15 of the intermediate or second transformer stage 14 and is connected to both the output of the intermediate or second amplifier stage 19, specifically collector terminal 23 of transistor 20, and to the input of the final amplifier stage 27, specifically to coupling capacitor 33. The output of the means 48 is connected through a resistor 58 to the input of the intermediate or second amplifier stage, that is, to base terminal 21 of transistor 20.

When the carrier signal is fully present in the signal which is transmitted through the intermediate frequency amplifier circuit there will be a positive bias on the detector output representative of this carrier amplitude as well as a second bias including an audio voltage on the detector output which is representative of the average sideband amplitude in the transmitted signal. The audio voltage is transmitted by capacitor 55 and the voltage doubling diodes 53, 54 develop a potential across capacitor 56 which is a negative potential proportional to the average sideband amplitude in the transmitted signal. The positive potential developed by the voltage divider network, because of the value chosen for resistor 50, will be equal in magnitude to the negative voltage applied across capacitor 56 and, therefore, no net voltage will appear at the output of the means 48 and hence none will be applied to the input of transistor amplifier 20.

When, however, the transmitted signal includes an attenuated carrier or when the carrier has been entirely suppressed, the positive bias across the detector output will be significantly reduced and, accordingly, the positive potential applied across the capacitor 56 in the means 48 will be significantly reduced. The negative potential on capacitor 56, representative of the average sideband amplitude, will remain the same and hence a net negative voltage will be applied from the means 48 through resistor 58 to the base terminal 21 of transistor 20. This results in an increased conduction of the transistor 20 and a significantly increased flow of current to the feedback winding 57. This in effect is a substantial amount of positive feedback through the winding 57 and, therefore, the effective Q of the tuned circuit comprising winding 15 and capacitor 16 increases to a very high value. The tuned circuit becomes operative to reinsert the carrier or to amplify it at the expense of the speech sidebands. The loop gain of the circuit including the means 48 may be adjusted so as to stabilize when the carrier has been restored 100 percent. The effective Q of the circuit required to realize carrier restoration at the conventional heterodyned frequency of 455 kc. will be several thousand. If it is desirable to operate at a lower effective Q, this can be done by employing a double superheterodyne approach and operating the second and final transformer stages at a frequency, for example, of 50 kc. The effective Q required will then be only a few hundred.

It will be noted that the magnitude of the voltage provided by the means 48 will be dependent upon the extent of reduction in the carrier amplitude on the output of the detector 42. This, consequently, will determine the amount of increased conduction of the transistor 20. The means 48 thus functions somewhat like an error circuit in a feedback control network to control the amount of positive feedback in the winding 57 and hence the amount of the carrier restoration or amplification a function of the amount of reduction in the carrier amplitude appearing on the detector output. A significant advantage of the carrier restoration scheme contemplated by this invention is its simplicity of construction and its ready adaptability to a standard intermediate frequency amplifier circuit included within a heterodyne receiver.

While the invention has been described with specificity, it is the aim of the appended claims to cover all such variations as come within the true scope of the foregoing disclosure.

What I claim as new and desire to secure by Letters Patent of the United States is:

1. In a radio receiver; a multistage intermediate frequency amplifier including an input transformer stage, a first amplifier stage having an input connected to the output of said input transformer stage, an intermediate transformer stage having an input comprising a tuned circuit, means for connecting the input of said intermediate transformer stage to the output of said first amplifier stage, an intermediate amplifier stage having an input and an output means for connecting the output of said intermediate transformer stage to said output of said intermediate amplifier stage, a final amplifier stage having an input and an output, a final transformer stage having a tuned input connected to the output of said final amplifier stage and an output, and a detector having an input connected to the output of said final transformer stage and an output, the improvement comprising:

a. means connected between the output of said detector and the input of said intermediate amplifier stage for providing a voltage to the input of said intermediate amplifier stage in response to a reduction in amplitude of the carrier signal on said detector output; and b. feedback means coupled to the input of said intermediate transformer stage and connected between the output of said intermediate amplifier stage and the input of said final amplifier stage whereby the amplitude of said carrier signal may be increased.

2. The apparatus recited in claim 1 wherein said means responsive to the reduction in amplitude of the carrier signal on said detector output comprises:

a. first means connected to said detector output for developing a potential of a first polarity and having an amplitude proportional to the amplitude of the carrier signal appearing on the output of said detector;

b. second means connected to said detector output for developing a potential of a second, opposite polarity having an amplitude proportional to the amplitude of the sideband signal appearing on the output of said detector, and c. voltage combining means connected to said first and second means.

3. The apparatus recited in claim 2 wherein said first means comprises a voltage divided connected to said detector output.

4. The apparatus recited in claim 3 wherein said voltage divider comprises a first resistor connected to said detector output and a second resistor connected to said first resistor and in parallel with said voltage combining means.

5. The apparatus recited in claim 2 wherein said second means comprises a capacitor connected to said detector output and a voltage doubling network connected between said capacitor and said voltage combining means.

6. The apparatus recited in claim 5 wherein said voltage doubling network comprises:

a. a first diode having an anode connected to one terminal of said voltage combining means and a cathode connected to said capacitor; and b. a second diode having an anode connected to the cathode of said first diode and having a cathode connected to another terminal of said voltage combining means.

7. The apparatus recited in claim 2 wherein voltage combining means comprises a capacitor.